(12) United States Patent
Egan et al.

(10) Patent No.: US 8,340,126 B2
(45) Date of Patent: Dec. 25, 2012

(54) METHOD AND APPARATUS FOR CONGESTION CONTROL

(75) Inventors: Martin W. Egan, Brandy Station, VA (US); Richard Louis Zinser, Niskayuna, NY (US); Bruce Gordon Barnett, Troy, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 283 days.

(21) Appl. No.: 12/795,172

(22) Filed: Jun. 7, 2010

(65) Prior Publication Data

US 2011/0299399 A1    Dec. 8, 2011

(51) Int. Cl.
*H04J 3/16* (2006.01)
(52) U.S. Cl. .................................. 370/468; 370/231
(58) Field of Classification Search .................. 370/468, 370/394, 229, 252, 231, 234, 230; 709/235, 709/233, 232
See application file for complete search history.

(56) References Cited

U.S. PATENT DOCUMENTS

| | | | |
|---|---|---|---|
| 6,173,323 B1 | 1/2001 | Moghe | |
| 6,510,142 B1 | 1/2003 | Kinnavy et al. | |
| 6,587,436 B1 | 7/2003 | Vu et al. | |
| 6,600,720 B1 | 7/2003 | Gvozdanovic | |
| 6,901,081 B1 | 5/2005 | Ludwig | |
| 6,993,591 B1 | 1/2006 | Klemm | |
| 7,426,181 B1 * | 9/2008 | Feroz et al. | 370/232 |
| 7,573,823 B2 | 8/2009 | Halme | |
| 8,125,910 B2 * | 2/2012 | Shimonishi et al. | 370/236 |
| 2003/0088690 A1 | 5/2003 | Zuckerman et al. | |
| 2003/0236827 A1 | 12/2003 | Patel et al. | |
| 2004/0213265 A1 | 10/2004 | Oueslati et al. | |
| 2005/0132062 A1 | 6/2005 | Halme | |
| 2005/0169180 A1 | 8/2005 | Ludwig | |
| 2006/0045011 A1 | 3/2006 | Aghvami et al. | |
| 2006/0045017 A1 | 3/2006 | Yamasaki | |
| 2006/0156164 A1 | 7/2006 | Meyer et al. | |
| 2007/0053373 A1 | 3/2007 | FitzGerald et al. | |
| 2007/0070906 A1 | 3/2007 | Thakur | |
| 2007/0115848 A1 | 5/2007 | Chean et al. | |
| 2007/0165524 A1 | 7/2007 | Mascolo | |
| 2007/0211633 A1 | 9/2007 | Gunawardena et al. | |
| 2007/0248013 A1 | 10/2007 | Sridharan et al. | |
| 2007/0274210 A1 | 11/2007 | Jang | |
| 2007/0275760 A1 | 11/2007 | Lundh et al. | |
| 2007/0297414 A1 | 12/2007 | Gupta et al. | |

(Continued)

FOREIGN PATENT DOCUMENTS

EP    1 450 514    8/2004

(Continued)

OTHER PUBLICATIONS

Oct. 21, 2009 Office Action issued in U.S. Appl. No. 12/068,329.

(Continued)

*Primary Examiner* — Chandrahas Patel
(74) *Attorney, Agent, or Firm* — Oliff & Berridge, PLC

(57) ABSTRACT

Aspects of the disclosure provide a method of congestion control. The method includes transmitting by a first apparatus to a second apparatus a packet stream corresponding to stream data generated by a variable data rate application, determining a round-trip-time of a packet in the packet stream, updating a congestion measure based on the round-trip-time, and informing the variable data rate application based on the congestion measure to adjust a data rate for generating the stream data.

12 Claims, 8 Drawing Sheets

U.S. PATENT DOCUMENTS

| | | |
|---|---|---|
| 2008/0144504 A1 | 6/2008 | Marcondes et al. |
| 2008/0181109 A1 | 7/2008 | Igarashi et al. |
| 2008/0192636 A1 | 8/2008 | Briscoe et al. |
| 2008/0198792 A1 | 8/2008 | Kim et al. |
| 2008/0225721 A1 | 9/2008 | Plamondon |
| 2008/0304413 A1 | 12/2008 | Briscoe et al. |
| 2009/0006920 A1 | 1/2009 | Munson et al. |
| 2009/0141631 A1 | 6/2009 | Kim et al. |
| 2009/0185488 A1 | 7/2009 | Beverly et al. |
| 2009/0196182 A1 | 8/2009 | Barnett et al. |
| 2009/0201828 A1 | 8/2009 | Samuels et al. |
| 2009/0254657 A1 | 10/2009 | Melnyk et al. |

FOREIGN PATENT DOCUMENTS

| | | |
|---|---|---|
| EP | 1 450 514 A1 | 8/2004 |

OTHER PUBLICATIONS

Feb. 17, 2010 Office Action issued in U.S. Appl. No. 12/068,329.

International Search Report and Written Opinion of the International Searching Authority mailed Mar. 21, 2011 in International Application No. PCT/US2011/020811.

\* cited by examiner

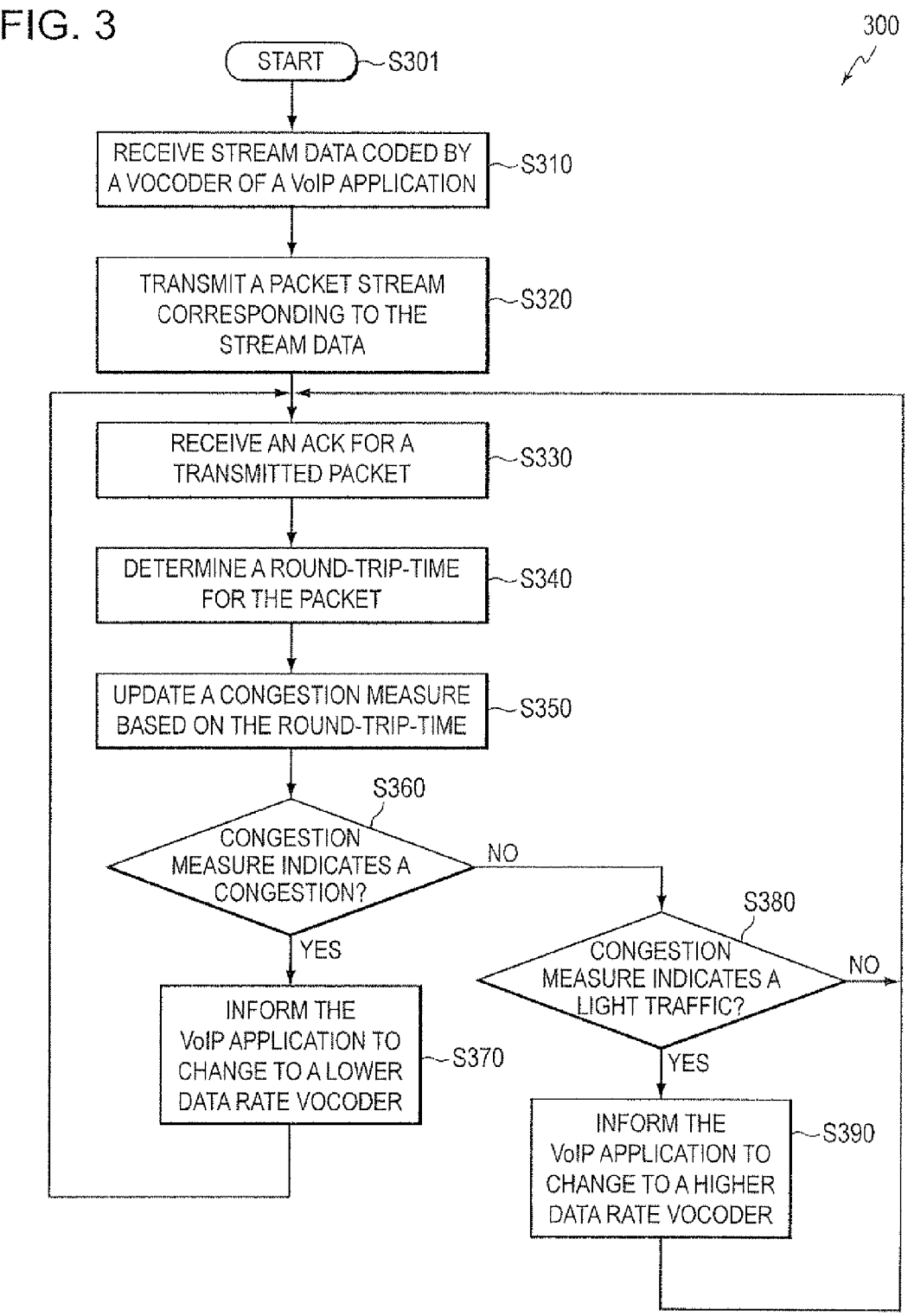

| CLASS | VOCODER STATE | RTT LEVEL | DELTA VALUE |
|---|---|---|---|
| C0 | HIGH RATE | SHORT: RTT ≤ LOWER LIMIT x PM | 0 OR RESET |
| C1 | HIGH RATE | MEDIUM: LOWER LIMIT x PM < RTT ≤ UPPER LIMIT x PM | -2 |
| C2 | HIGH RATE | LONG: UPPER LIMIT x PM < RTT | -4 |
| C3 | MEDIUM RATE | SHORT: RTT ≤ LOWER LIMIT x PM | +1 |
| C4 | MEDIUM RATE | MEDIUM: LOWER LIMIT x PM < RTT ≤ UPPER LIMIT x PM | 0 |
| C5 | MEDIUM RATE | LONG: UPPER LIMIT x PM < RTT | -2 |
| C6 | LOW RATE | SHORT: RTT ≤ LOWER LIMIT x PM | +2 |
| C7 | LOW RATE | MEDIUM: LOWER LIMIT x PM < RTT ≤ UPPER LIMIT x PM | +1 |
| C8 | LOW RATE | LONG: UPPER LIMIT x PM < RTT | 0 OR RESET |

FIG. 5

METHOD AND APPARATUS FOR CONGESTION CONTROL

BACKGROUND

Network congestion can affect communication quality, especially for real time communications, such as voice over internet protocol (VoIP), online gaming, video conference, and the like. In a video conference example, video image data packets can be piled up in a buffer of a router during times of heavy network congestion, and therefore, video image transmission delay can be long. Worse yet, the video image data packets can be dropped by the router when the buffer is low on storage space, which can result in a video conference image that is choppy. On the other hand, real time communications can attempt to occupy a large amount of network communication resources, which can increase network congestion. For example, a video conference may transmit high resolution video image in an already congested network, and thus exacerbate an already bad network congestion situation.

In a technique to relieve network congestion, transport protocols, such as TCP, can slow down packet sending rate, and thus reduce an amount of packets that enter the network. In another technique, a router can selectively drop low priority packets, while permitting high priority packets go through.

SUMMARY

Aspects of the disclosure can provide a method of congestion control. The method includes transmitting by a first apparatus to a second apparatus a packet stream corresponding to stream data generated by a variable data rate application, determining a round-trip-time of a packet in the packet stream, updating a congestion measure based on the round-trip-time, and informing the variable data rate application based on the congestion measure to adjust a data rate for generating the stream data.

To determine the round-trip-time of the packet in the packet stream, the method includes receiving an acknowledgement packet corresponding to the packet being received by the second apparatus, retrieving a time stamp in the acknowledgement packet that indicates a transmitting time of the packet, and calculating the round-trip-time as a time difference of a present time and the transmitting time. In an embodiment, the method includes weighting the round-trip-time based on a priority assigned to the packet stream.

To update the congestion measure based on the round-trip-time, the method includes determining a delta value of the congestion measure as a function of the round-trip-time and the data rate, and updating the congestion measure based on the delta value.

To determine the delta value of the congestion measure as a function of the round-trip-time and the data rate, the method includes determining a class for the packet as a combination of the round-trip-time and the data rate, and retrieving the delta value that is in association with the class.

To update the congestion measure based on the delta value, the method includes counting up/down the congestion measure based on the delta value.

To inform the variable data rate application based on the congestion measure to adjust the data rate for generating the stream data, the method includes comparing the congestion measure to thresholds, and informing the variable data rate application to increase/decrease the data rate based on the comparison.

In an embodiment, the method is implemented in software instructions. The software instructions can be stored on a non-transitory computer readable medium, and can be executed by a processor to perform the functions in the method.

Aspects of the disclosure can provide an apparatus for congestion control. The apparatus includes a variable data rate application configured to generate stream data having a data rate that is adjustable, and a transport protocol configured to transmit to a receiving apparatus a packet stream corresponding to the stream data generated by the variable data rate application. Further, the transport protocol determines a round-trip-time of a packet in the packet stream, updates a congestion measure based on the round-trip-time, and informs the variable data rate application to adjust the data rate based on the congestion measure.

To determine the round-trip-time of the packet in the packet stream, the transport protocol is further configured to receive an acknowledgement packet corresponding to the packet being received by the receiving apparatus, retrieve a time stamp in the acknowledgement packet that indicates a transmitting time of the packet, and calculate a time difference of a present time and the transmitting time. In an embodiment, the transport protocol is configured to weight the round-trip-time based on a priority assigned to the packet stream.

To update the congestion measure based on the round-trip-time, the transport protocol is further configured to determine a delta value of the congestion measure as a function of the round-trip-time and the data rate, and update the congestion measure based on the delta value.

To determine the delta value of the congestion measure as a function of the round-trip-time and the data rate, the transport protocol is further configured to determine a class as a combination of the round-trip-time and the data rate, and retrieve the delta value that is in association with the class.

In an embodiment, the transport protocol includes a counter configured to count up/down the congestion measure based on the delta value.

Further, the transport protocol is configured to compare the congestion measure to thresholds, and inform the variable data rate application to increase/decrease the data rate based on the comparison.

BRIEF DESCRIPTION OF THE DRAWINGS

Various embodiments of this disclosure that are proposed as examples will be described in detail with reference to the following figures, wherein like numerals reference like elements, and wherein:

FIG. 3 shows a flowchart outlining a congestion control process example 300 according to an embodiment of the disclosure;

FIG. 5 shows a table of classes for calculating a congestion measure according to an embodiment of the disclosure;

DETAILED DESCRIPTION OF EMBODIMENTS

Figure 1:
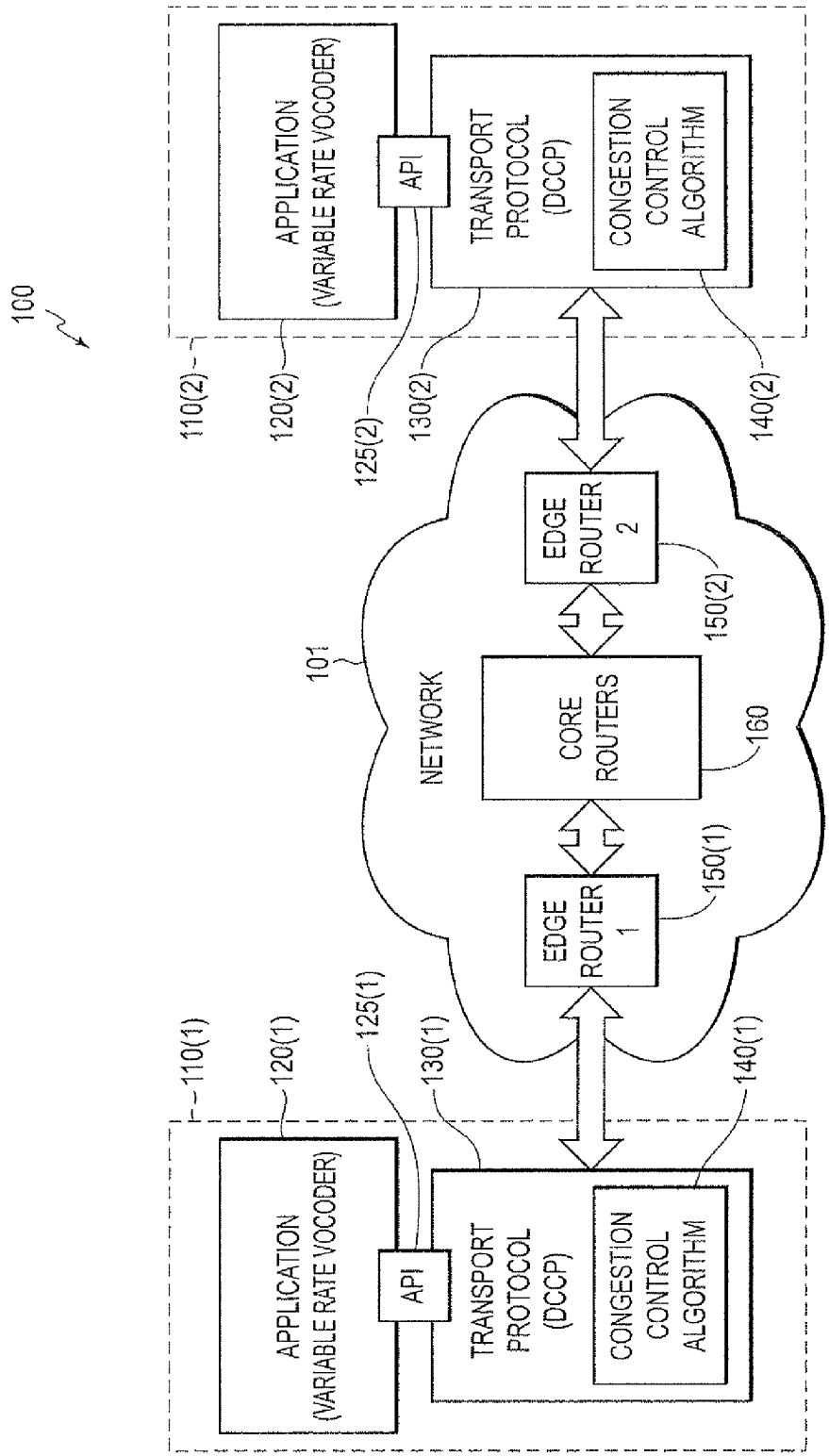
FIG. 1 shows a block diagram of a congestion control system example 100 according to an embodiment of the disclosure.

FIG. 1 shows a block diagram of a congestion control system example 100 according to an embodiment of the disclosure. The congestion control system 100 includes network 101, and a plurality of terminals 110(1-2) coupled with the network 101. At least one of the plurality of terminals 110(1-2) includes a congestion control algorithm 140.

The network 101 may be a single network or a plurality of networks of the same or different types. For example, the network 101 may include a local telephone network in connection with a long distance telephone network. Further, the network 101 may be a data network or a telecommunications or video distribution (e.g. cable, terrestrial broadcast, or satellite) network in connection with a data network. Any combination of telecommunications, video/audio distribution and data networks, whether a global, national, regional, wide-area, local area, or in-home network, may be used without departing from the spirit and scope of the present disclosure. For the purposes of discussion, it will be assumed that the network 101 is a single integrated voice, video and data network that is either wired and/or wireless.

In an embodiment, the network 101 includes various routers, such edge routers 150(1-2), and core routers 160. The edge routers 150(1-2) couple the plurality of terminals 110(1-2) to the network 101. The edge routers 150(1-2) may suitably adjust data packet. In an example, the edge router 150(1) adds a priority mark in a packet received from a first terminal 110(1) before sending the packet to core routers 160, and removes a priority marker in a packet received from the core routers 160 before sending the packet to the first terminal 110(1).

The plurality of terminals 110(1-2) can be devices of any type that allow for the transmission and/or reception of communication signals. For example, the plurality of terminals 110(1-2) can be land-line telephones, cellular telephones, computers, personal digital assistants, video telephones, video conference apparatuses, smart or computer assisted televisions, Web TV and the like. For the purposes of the following description of the present invention, it will be assumed that terminals 110(1-2) are personal computers.

At least one of the plurality of terminals 110(1-2), such as the first terminal 110(1), includes a congestion control algorithm 140, such as a first congestion control algorithm 140(1). In an embodiment, the first congestion control algorithm 140(1) is implemented as a plug-in module that can be suitably plugged in any suitable component of the first terminal 110(1). In the FIG. 1 example, the first terminal 110(1) includes a first application 120(1), a first transport protocol 130(1), and a first API 125(1) coupling the first application 120(1) and the first transport protocol 130(1) together. The first application 120(1) generates stream data, and transmits the stream data to a receiving terminal over the network 101. The first congestion control algorithm 140(1) is plugged in the first transport protocol 130(1). The first congestion control algorithm 140(1) detects a congestion status of the network 101, informs the first application 120(1) to be aware of the congestion status, and causes the first application 120(1) to adjust a data rate for generating the stream data.

In an embodiment, the first application 120(1) is a real-time stream application that uses the network 101 to transport real-time stream data, such as real-time video/audio data, to one or more receiving terminals, such as a second terminal 110(2), and the like. The first application 120(1) has adjustable data rate, for example, by adjusting video/audio quality, resolution, compression rate, and the like. In an example, the first application 120(1) is a voice over internet protocol (VoIP) application. The VoIP application captures voice, converts the captured voice into digital voice data, and uses the network 101 to transmit the digital voice data to one or more receiving terminals, such as the second terminal 110(2), and the like. The VOIP application includes a variable rate voice coder (vocoder). In an implementation example, the variable rate vocoder includes three vocoders: a time domain voicing cutoff (TDVC) vocoder, an internet low bit-rate codec (iLBC) vocoder, and a low quality vocoder. Of the three vocoders, the iLBC vocoder has a highest voice quality with a largest data rate that requires a largest bandwidth, the TDVC vocoder has a medium voice quality with a medium data rate that requires a medium bandwidth, and the low quality vocoder has a lowest voice quality with a smallest data rate that requires a smallest bandwidth. The variable rate vocoder selectively uses one of the vocoders to convert the captured voice into digital voice data based on a detected congestion status of the network 101.

The first API 125(1) uses any suitable technique to transport data between the first application 120(1) and the first transport protocol 130(1). In an example, the first API 125(1) transports digital voice data from the first application 120(1) to the first transport protocol 130(1). In another example, the first API 125(1) transports a signal indicative of a detected congestion status of the network 101 from the first transport protocol 130(1) to the first application 120(1).

The first transport protocol 130(1) can be any suitable transport protocol. In an example, the first transport protocol 130(1) is implemented as datagram congestion control protocol (DCCP). During operation, for example, DCCP buffers packets when congestion is detected, and thus increases delays. For real-time application, the delays may cause undesired pause or break of communication. According to an embodiment of the disclosure, the first congestion control algorithm 140(1) can be plugged in the first transport protocol 130(1). The first congestion control algorithm 140(1) detects a congestion status of the network 101, and causes the first API 125(1) to transport a signal indicative the congestion status of the network 101. In an embodiment, the first congestion control algorithm 140(1) detects the congestion status based on round-trip-time of transmitted packets.

In an example, the first transport protocol 130(1) transmits a packet having a portion of the stream data generated by the first application 120(1). The packet includes a time stamp to indicate a first transmitting time. When the packet is received by a receiving terminal, the receiving terminal returns an acknowledgement (ACK) packet including the time stamp. When the ACK packet is received by the first terminal 110(1), the first congestion control algorithm 140(1) obtains the time stamp, and calculates a time difference between a present time and the first transmitting time as the round-trip-time.

It is noted that the round-trip-time can be an indicator of congestion. For example, when the network 101 is congested, the packet or the ACK packet may be buffered at one or more routers in the network 101 for a relatively long time, thus the round-trip-time can be relatively large. Worse yet, the packet or the ACK packet may be dropped or lost in the network 101. In response to packet loss, in an example, the first transport protocol 130(1) retransmits the packet having the same time stamp that indicates the first transmitting time. Thus, the round-trip-time is relatively large.

Based on the round-trip-time, the first congestion control algorithm 140(1) updates a congestion measure that is indicative of the congestion status of the network 101. In an example, the first congestion control algorithm 140(1) includes a counter to count the congestion measure. For each received ACK packet, the first congestion control algorithm 140(1) calculates a round-trip-time, and determines a delta value based on the round-trip-time. Then, the counter counts up/down based on the delta value.

It is noted that the delta value may be adjusted based on various factors, such as a vocoder state, a priority of a phone call, and the like. Further, the delta value can be determined by any suitable technique, such as calculation, look-up table and the like. In an example, the round-trip-time is weighted by a priority of a phone call. Further, the weighted round-trip-time is classified into a class based on a combination of a vocoder state and a level of the weighted round-trip-time. Each class is in association with a delta value. In an example, the vocoder state includes a TDVC vocoder, an iLBC vocoder, and a low voice quality vocoder; and the level of the weighted round-trip-time includes a short round-trip-time, a medium round-trip-time, and a long round-trip-time. For example, a class is TCVC cocoder with a short round-trip-time and is in association with a delta value of (+1), and another class is iLBC vocoder with a medium round-trip-time and is in association with a delta value of (−2), and the like.

Based on the congestion measure, the first congestion control algorithm 140(1) sends a signal to the first application 120(1) via 125(1) to inform the first application 120(1). In response to the signal, the first application 120(1) may keep the present vocoder, upgrade to a higher quality vocoder, or downgrade to a lower quality vocoder.

During operation, for example, the first application 120(1) initiates a VoIP phone call having a relatively high priority with the second terminal 110(2). The first application 120(1) captures voice, uses iLBC vocoder to convert the captured voice into digital voice data, and provides the digital voice data to the first transport protocol 130(1) via the first API 125(1).

The first transport protocol 130(1) suitably packages the digital voice data into a packet stream, for example, adding a sequence number, a time stamp and the like. Further, the first transport protocol 130(1) transmits the packet stream to the edge router 150(1). The edge router 150(1) suitably marks packets in the packet stream based on the relatively high priority, and transmits the marked packets to the core routers 160. The core routers 160 suitably deliver the packets to the edge router 150(2). The edge router 150 takes off the priority makers of the received packets, and provides the packets to the second terminal 110(2). The second terminal 110(1) suitably returns ACK packets in response to the received packets.

When an ACK packet is received by the first terminal 110(1), the first congestion control algorithm 140(1) calculates a round-trip-time. The round-trip-time can be weighted based on the relatively high priority of the phone call. Further, the weighted round-trip-time is classified into a class based on a combination of a vocoder state and a level of the weighted round-trip-time, such as iLBC vocoder with a medium round-trip-time. The class is in association with a delta value, such as (−2). Based on the delta value, a counter for counting a congestion measure counts down by two.

Based on the congestion measure, the first congestion control algorithm 140(1) sends a signal to the first application 120(1) via 125(1) to inform the first application 120(1). In an example, the first congestion control algorithm 140(1) compares the congestion measure to thresholds, and sends the signal based on the comparison. In response to the signal, the first application 120(1) may keep the present vocoder, upgrade to a higher quality vocoder, or downgrade to a lower quality vocoder.

It is noted that a receiving terminal may or may not include the congestion control algorithm. In an example, the second terminal 110(2) includes a second application 120(2), a second transport protocol 130(2), and a second API 125(2) coupling the second application 120(2) with the second transport protocol 130(2). The second transport protocol 130(2) includes a second congestion control algorithm 140(2). It is noted that the first application 120(1) and the second application 120(2) can be the same or different; the first transport protocol 130(1) and the second transport protocol 130(2) can be the same or different; and the first congestion control algorithm 140(1) and the second congestion control algorithm 140(2) can be the same or different.

Figure 2:
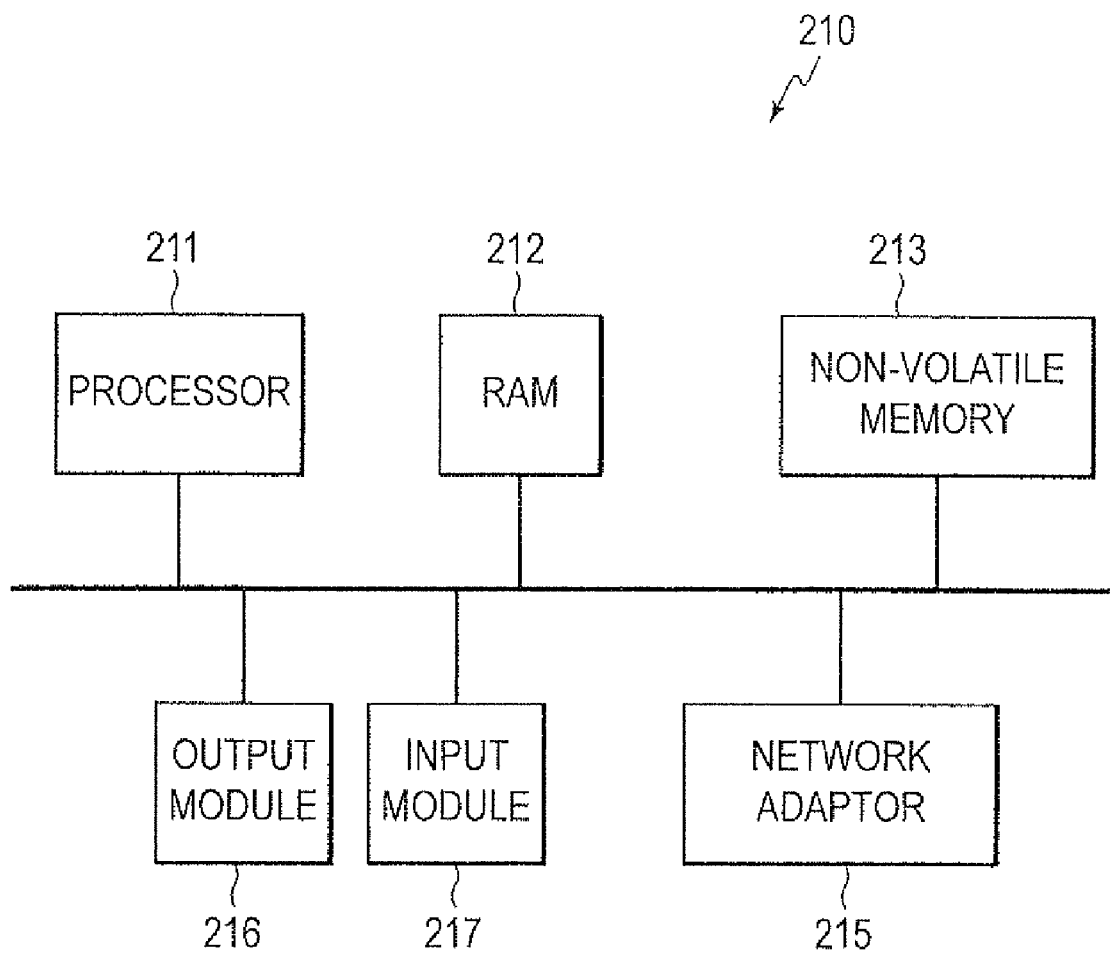
FIG. 2 shows a block diagram of a congestion control terminal example 210 according to an embodiment of the disclosure.

FIG. 2 shows a block diagram of a congestion control terminal example 210 according to an embodiment of the disclosure. The congestion control terminal 210 includes a processor 211, a random access memory (RAM) 212, a non-volatile memory 213, an output module 216, an input module 217, and a network adaptor 215. These elements are coupled together as shown in FIG. 2.

The processor 211 executes various code instructions, such as operating system code instructions, service code instructions, application code instructions, and the like. Specifically, the processor 211 executes operating system code instructions to perform various system functions, such as memory management, task scheduling, interrupt handling, and the like. Also, the processor 211 executes service code instructions, such as network protocols, and the like. Further, the processor 211 executes application code instructions to perforin specific application functions. For example, the processor 211 executes instruction codes for a VoIP application that uses the network 101 in FIG. 1, for example, to transport real-time voice data.

The non-volatile memory 213 holds information even when power is off. Therefore, the non-volatile memory 213 can be used to store system, service and application code instructions. It should be understood that the non-volatile memory 213 may include various non-volatile memory devices, such as battery backup RAM, read only memory (ROM), programmable ROM (PROM), flash PROM, electrical erasable PROM (EEPROM), magnetic storage, optical storage, and the like.

The RAM 212 is readable and writable. Generally, the RAM 212 has fast access speed. It can be preferred that data and code instructions are stored in the RAM 212 during operation, such that the processor 211 accesses the RAM 212 for code instructions and data instead of the non-volatile memory 213. Thus, the system performance can be improved.

The input module 217, such as telephone, camera, keyboard and PDA, can be configured to convert inputs, such as voice, image, key-strike, handwriting, and the like, into electrical signals, either analog or digital. The output module 216, such as telephone, monitor, PDA, and the like, can be configured to convert digital data to a user perceivable format, such as sound and image.

The network adaptor 215, such as USB, Ethernet, IEEE 1394, wireless adaptor, and the like, enables the congestion control terminal 210 connected to the network 101, for example. The network adaptor 215 can integrate a transmitter for transmitting data to the network 101, and a receiver for receiving data from the network 101.

In an embodiment, a congestion control algorithm is implemented as a software module stored in the non-volatile memory 213. The software module can be plugged in a network protocol, such as DCCP, and executed by the processor 211 to perform congestion control operations. In another embodiment, the congestion control algorithm can be implemented as a hardware module, such as application specific integrated circuit (ASIC), integrated with the processor 211, or the network adaptor 215.

During operation, for example, the processor 211 executes the system code instructions, service code instruction, and application code instructions stored in the RAM 212 or the non-volatile memory 213. For example, the processor 211 executes code instructions of a VoIP application having multiple vocoders of different data rates. Specifically, the processor 211 receives input data, such as sampled digital data of voice, from the input module 217. Further, the processor 211 suitably processes the input data, such as voice coding, compressing, packaging, and the like. Then, the processor 211 provides the processed input data in the form of packets to the network adaptor 215 for transmitting. Further, the processor 211 executes the congestion control algorithm. Specifically, the processor 211 observes data received from the network adaptor 215. When an acknowledgement packet in response to a transmitted packet is received, the processor 211 determines a round-trip-time. Further, the processor 211 updates a congestion measure based on the round-trip-time. Based on the congestion measure, the processor 211 informs the VoIP application to keep or change vocoder, for example.

FIG. 3 shows a flowchart outlining a congestion control process example 300 according to an embodiment of the disclosure. The congestion control process 300 can be executed by a terminal, such as the first terminal 110(1), to use Internet protocol to have a phone call with a second terminal, such as the second terminal 120(1). As shown in the FIG. 1, the first terminal 110(1) can include a VoIP application 120 (1), and a DCCP 130(1). The VoIP application 120(1) includes multiple vocoders that code voice into stream data of different data rates. The DCCP 130(1) includes a plugged-in congestion control algorithm 140(1). The process 300 is executed by the DCCP 130(1) based on the congestion control algorithm 140(1). The process starts from S301 and proceeds to S310.

At S310, the DCCP 130(1) receives stream data coded by one of the vocoders of the VoIP application 120(1).

At S320, the DCCP 130(1) suitably transmits a packet stream corresponding to the stream data. Each packet in the packet stream includes a time stamp indicating a transmitting time of the packet.

At S330, the DCCP 130(1) receives an ACK packet corresponding to a transmitted packet. The ACK packet is returned from the second terminal 110(2) in response to the second terminal 110(2) receiving the transmitted packet. The ACK packet includes the time stamp of the transmitted packet.

At S340, the DCCP 130(1) determines a round-trip-time based on the ACK packet. For example, the DCCP 130(1) obtains the time stamp of the transmitted packet from the ACK packet. The time stamp indicates a transmitting time of the transmitted packet. The DCCP 130(1) calculates the round-trip-time as a time difference between a present time and the time stamp.

At S350, the DCCP 130(1) updates a congestion measure based on the round-trip-time. In an embodiment, the DCCP 130(1) determines a delta value for the congestion measure based on the round-trip-time, and counts up/down the congestion measure based on the delta value.

At S360, the DCCP 130(1) determines whether the congestion measure indicates that the network is congested. In an example, the DCCP 130(1) compares the congestion measure with a threshold, and determines a congestion status based on the comparison. When the congestion measure indicates that the network is congested, the process proceeds to S370; otherwise the process proceeds to S380.

At S370, the DCCP 130(1) informs the VoIP application 120(1) to change to a lower date rate vocoder. Then, the process proceeds to S330 to receive another ACK packet corresponding to another transmitted packet.

At S380, the DCCP 130(1) determines whether the congestion measure indicates a light traffic in the network 101. When traffic on the network 101 is light, the process proceeds to S390; otherwise, the process returns to S330 to receive another ACK packet corresponding to another transmitted packet.

At S390, the DCCP 130(1) informs the VoIP application 120(1) to change to a higher date rate vocoder. Then, the process proceeds to S330 to receive another ACK packet corresponding to another transmitted packet.

It is noted that steps in the congestion control process 300 may be executed in parallel. For example, the DCCP 130(1) executes S330-S390 in parallel with S310-S320.

Figure 4A:
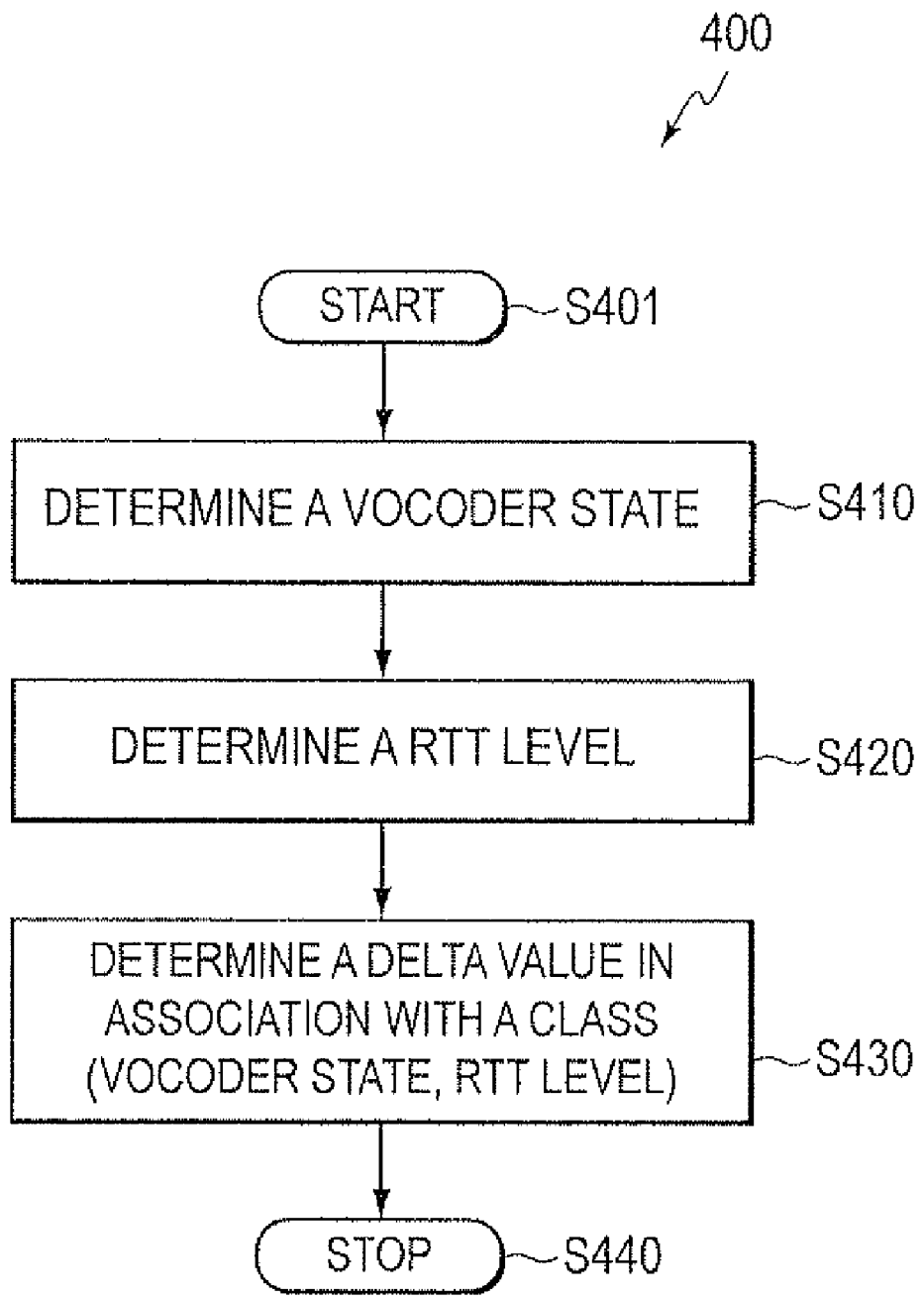
FIG. 4A shows a flowchart outlining a decision process example 400 according to an embodiment of the disclosure.

FIG. 4A shows a flowchart outlining a process example 400 for a congestion control algorithm to determine a delta value for a counter to count up/down a congestion measure based on a round-trip-time (RTT) according to an embodiment of the disclosure. The process starts at S401 and proceeds to S410.

At S410, the congestion control algorithm determines a vocoder state. For example, the congestion control algorithm suitably determines whether a present vocoder is iLBC vocoder, TDVC vocoder, or a low voice quality vocoder.

At S420, the congestion control algorithm determines a round-trip-time (RTT) level of the RTT. The congestion control algorithm compares the RTT with RTT level boundary limits to determine the appropriate RTT level of the RTT. It is noted that the RTT level can be a function of a priority of a phone call. In an example, the boundary limit of RTT levels are the same for different priorities, but the RTT is weighted based on a priority multiplier that is different for different priorities, such as larger priority multiplier for higher priority. In another example, the boundary limits of RTT levels are weighted based on the priority multiplier.

At S430, the congestion control algorithm determines a delta value in association with a class that is defined as a combination of the vocoder state and the RTT level. The process then proceeds to S440, and terminates.

Figure 4B:
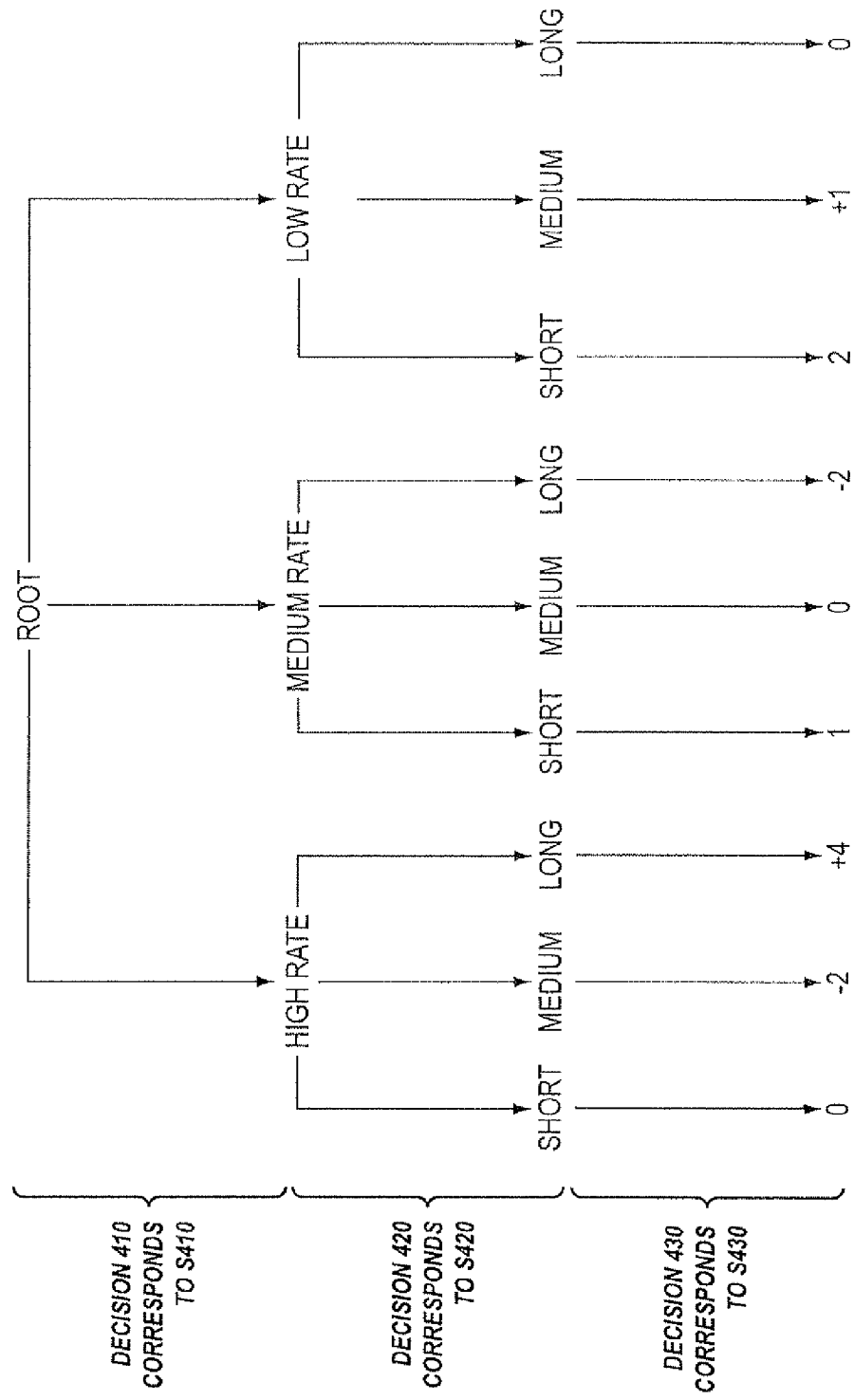
FIG. 4B shows a diagram of a decision tree corresponding to the decision process 400.

FIG. 4B shows a decision tree corresponding to the process 400 in FIG. 4A. The decision tree includes a first decision 410 corresponding to S410, a second decision 420 corresponding to S420, and a third decision 430 corresponding to S430.

FIG. 5 shows a table 500 of classes according to an embodiment of the disclosure. The table 500 includes a class field 510, a vocoder state field 520, a RTT level field 530, and a delta value field 540. Each class (a row) is defined as a combination of vocoder state and RTT level. Further, each class is in association with a delta value. Thus, the table 500 can be used to determine a delta value based on a combination of vocoder state and RTT level.

In the FIG. 5 example, the boundary limits, such as a lower limit and an upper limit, for the RTT levels are scaled by a priority multiplier (PM). It is noted that, in another example, the boundary limits are not weighted, but the RTT is weighted based on the priority multiplier, such as an inverse of the priority multiplier.

Figure 6:
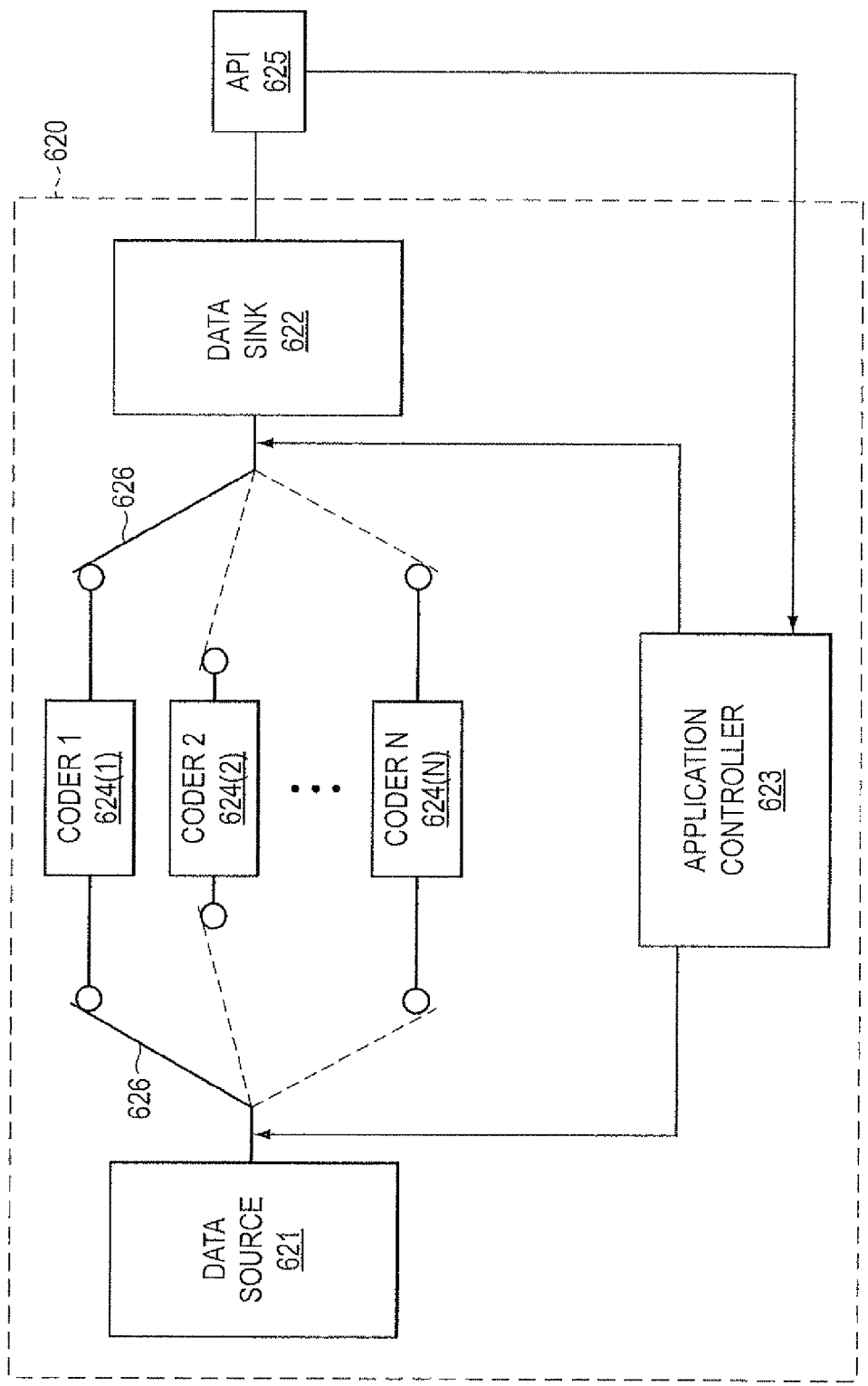
FIG. 6 shows a block diagram of a variable data rate application example 620 according to an embodiment of the disclosure.

FIG. 6 shows a block diagram of a variable data rate application example 620 coupled with an API module 625 according to an embodiment of the disclosure. The variable data rate application 620 includes a data source 621, a plurality of coders 624(1-n), a data sink 622, a switch 626, and an application controller 623. These elements are coupled together as shown in FIG. 6.

The data source 621 provides input data for coding. In an example, the data source 621 is coupled to a voice collecting apparatus. The voice collecting apparatus collects voice and generates digitalized voice sampling data in response to the collected voice. The data source 621 provides the digitalized voice sampling data for coding. In another example, the data source 621 is coupled to a storage medium that stores video data. The data source 621 provides the video data for coding.

The plurality of coders 624(1-N) encode the input data with different data rates. In an example, the plurality of coders 624(1-n) include different voice coders (vocoders) that can encode a voice signal with different qualities. For example, the coder 624(1) is an iLBC vocoder that encodes the voice signal with a first quality, while the coder 624(2) is a TDVC vocoder that encodes the voice signal with a second quality that is lower than the first quality. On the other hand, the iLBC vocoder 624(1) has a first data rate that is larger than a second data rate of the TDVC vocoder 624(2). Therefore, the iLBC vocoder 624(1) requires a larger network bandwidth compared to the TDVC vocoder 624(2). The data sink 622 formats and packetizes the encoded data, and sends a packet stream to a network protocol via the API 625. The packet stream is then transmitted over a network to one or more receiving apparatuses. In addition, the variable data rate application 620 includes an application controller 623 coupled with the API 625 and the switch 626. The application controller 623 is configured to receive signals from the API 625 that indicate the congestion status of the network, and control the switch 626 to select an appropriate coder according to the congestion status of the network.

During operation, for example, the application controller 623 controls the switch 626 to select a default coder at an initial time. The default coder encodes the input data from the data source 621, and outputs the encoded data to the data sink 622. The data sink 622 then sends the encoded data to the network protocol via the API 625. The network protocol then transports the encoded data to the network. In addition, the network protocol can receive information that is indicative of the congestion status of the network, and communicates the congestion status of the network to the application controller 623 via API 625. Then the application controller 623 can control the switch 626 to select an appropriate coder based on the congestion status of the network.

In a variable data rate VoIP application example, the application controller 623 controls the switch 626 to select the iLBC vocoder 624(1) initially, for example. The iLBC vocoder 624(1) encodes the input voice data with a relatively high quality. The encoded data has a relatively high data rate that requires a relatively large network bandwidth. When the network does not have enough bandwidth, the network experiences high congestion. Therefore, some packets are dropped by the network, and cannot arrive at the receiving apparatus. When the receiving apparatus receives a packet, the receiving apparatus returns an ACK packet. On the sender side, the network protocol receives ACK packets, and calculates round-trip-time based on the ACKs. The network protocol further includes a congestion control algorithm. The congestion control algorithm can determine a congestion measure based on round-trip-time, and send a signal to the variable data rate VoIP based on the congestion measure. For example, when the signal is indicative of a congested status, the application controller 623 can control the switch 626 to choose the TDVC vocoder 624(2) that requires less network bandwidth.

Figure 7:
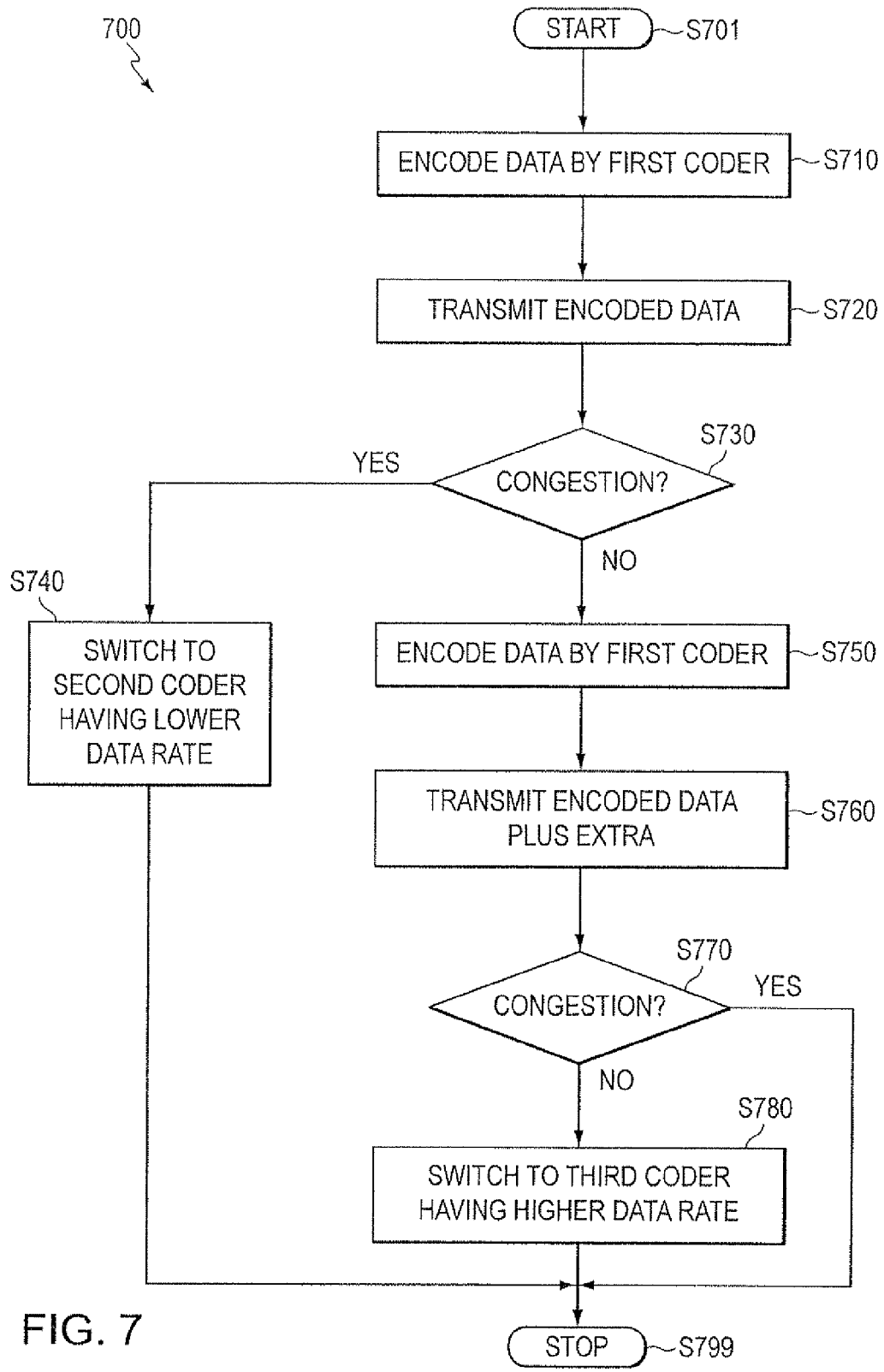
FIG. 7 shows a flow chart outlining a process example 700 for a variable data rate application to adjust data rate according to an embodiment of the disclosure.

FIG. 7 shows a flow chart outlining a process example 700 for a variable data rate application to adjust data rate according to an embodiment of the disclosure. The process starts at step S701, and proceeds to S710.

At S710, a first coder of a variable data rate application is used to encode input data.

At S720, the encoded data is provided to a network protocol, such as via API. The network protocol transmits the encoded data to a receiver via a network.

At S730, the variable data rate application receives a signal from the network protocol. The signal is indicative of a congestion status of the network. When the network is congested, the process proceeds to step S740; otherwise, the process proceeds to S750.

At S740, the variable data rate application chooses a second coder having lower data rate to encode the input data. Then the process proceeds to step S799 and terminates.

At S750, the variable data rate application continuously uses the first coder to encode the input data.

At S760, the variable data rate application sends the encoded data and additional data, such as dummy data or informative data, to the network protocol. The network protocol then transmits the encoded and additional data to the receiver via the network.

At S770, the variable data rate application receives the signal indicative of the congestion status of the network. When the network is congested, the variable data rate application continues using the first coder and stops sending extra data, and then the process proceeds to step S799 and terminates. When the network is not congested, the variable data rate application can choose a third coder having even higher data rate to encode the input date. Then, the process proceeds to step S799 and terminates.

It should be understood that the second coder can include a coder that stops encoding, therefore the variable data rate application can stop sending data to the network.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for congestion control, comprising:
  transmitting by a first apparatus to a second apparatus a packet stream corresponding to stream data generated by a variable data rate application;
  determining a round-trip-time of a packet in the packet stream;
  weighting the round-trip-time based on a priority assigned to the packet stream to generate a weighted round-trip-time;
  updating a congestion measure based on the weighted round-trip-time;
  determining a delta value of the congestion measure as a function of the round-trip-time and the data rate;
  determining a class for the packet as a combination of the round-trip-time and the data rate;
  retrieving the delta value that is in association with the class;

updating the congestion measure based on the delta value; and informing the variable data rate application based on the congestion measure to adjust a data rate for generating the stream data.

2. The method of claim 1, wherein determining the round-trip-time of the packet in the packet stream further comprises:
receiving an acknowledgement packet corresponding to the packet being received by the second apparatus;
retrieving a time stamp in the acknowledgement packet that indicates a transmitting time of the packet; and
calculating a time difference of a present time and the transmitting time.

3. The method of claim 1, wherein updating the congestion measure based on the delta value further comprises:
counting up/down the congestion measure based on the delta value.

4. The method of claim 1, wherein informing the variable data rate application based on the congestion measure to adjust the data rate for generating the stream data, further comprises:
comparing the congestion measure to thresholds; and
informing the variable data rate application to increase/decrease the data rate based on the comparison.

5. A non-transitory computer readable medium storing program instructions for causing a processor to execute operations for congestion control, the operations comprising:
transmitting by a first apparatus to a second apparatus a packet stream corresponding to stream data generated by a variable data rate application;
determining a round-trip-time of a packet in the packet stream;
weighting the round-trip-time based on a priority assigned to the packet stream to generate a weighted round-trip-time;
updating a congestion measure based on the weighted round-trip-time;
determining a delta value of the congestion measure as a function of the round-trip-time and the data rate;
determining a class for the packet as a combination of the round-trip-time and the stream data rate;
retrieving the delta value that is in association with the class;
updating the congestion measure based on the delta value; and
informing the variable data rate application based on the congestion measure to adjust a data rate for generating the stream data.

6. The non-transitory computer readable medium of claim 5, wherein the operation of determining the round-trip-time of the packet in the packet stream further comprises:
receiving an acknowledgement packet corresponding to the packet being received by the second apparatus;
retrieving a time stamp in the acknowledgement packet that indicates a transmitting time of the packet; and
calculating a time difference of a present time and the transmitting time.

7. The non-transitory computer readable medium of claim 5, wherein the operation of updating the congestion measure based on the delta value further comprises:
counting up/down the congestion measure based on the delta value.

8. The non-transitory computer readable medium of claim 5, wherein the operation of informing the variable data rate application to adjust the data rate based on the congestion measure further comprises:
comparing the congestion measure to thresholds; and
informing the variable data rate application to increase/decrease the data rate based on the comparison.

9. An apparatus for congestion control, comprising:
a variable data rate application configured to generate stream data having a data rate that is adjustable; and
a transport protocol configured to transmit to a receiving apparatus a packet stream corresponding to the stream data generated by the variable data rate application, determine a round-trip-time of a packet in the packet stream, weight the round-trip-time based on a priority assigned to the packet stream generating a weighted round-trip-time, update a congestion measure based on the weighted round-trip-time, determine a delta value of the congestion measure as a function of the round-trip-time and the data rate, and update the congestion measure based on the delta value, determine a class as a combination of the round-trip-time and the data rate, and retrieve the delta value that is in association with the class, and inform the variable data rate application to adjust the data rate based on the congestion measure.

10. The apparatus of claim 9, wherein the transport protocol is further configured to receive an acknowledgement packet corresponding to the packet being received by the receiving apparatus, retrieve a time stamp in the acknowledgement packet that indicates a transmitting time of the packet, and calculate a time difference of a present time and the transmitting time.

11. The apparatus of claim 9, wherein the transport protocol is configured to compare the congestion measure to thresholds, and inform the variable data rate application to increase/decrease the data rate based on the comparison.

12. The apparatus of claim 9, wherein the transport protocol comprises:
a counter configured to count up/down the congestion measure based on the delta value.

* * * * *